(12) United States Patent
Balsiger et al.

(10) Patent No.: US 12,215,769 B2
(45) Date of Patent: Feb. 4, 2025

(54) HARMONIC DRIVE WITH FLEX SPLINE END CLAMPS

(71) Applicant: Hamilton Sundstrand Corporation, Charlotte, NC (US)

(72) Inventors: Derick S. Balsiger, Prescott Valley, AZ (US); Keith A. Bloxham, Gilbert, AZ (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 60 days.

(21) Appl. No.: 18/168,178

(22) Filed: Feb. 13, 2023

(65) Prior Publication Data

US 2024/0271687 A1  Aug. 15, 2024

(51) Int. Cl.
*F16H 49/00* (2006.01)
*B64C 13/38* (2006.01)

(52) U.S. Cl.
CPC .......... *F16H 49/001* (2013.01); *B64C 13/38* (2013.01); *F16H 2049/003* (2013.01)

(58) Field of Classification Search
CPC .. F16H 49/00; F16H 49/001; F16H 2049/003; B64C 13/38
See application file for complete search history.

(56) References Cited

U.S. PATENT DOCUMENTS

| | | | |
|---|---|---|---|
| 3,523,488 A * | 8/1970 | Robinson | F16H 49/001 74/640 |
| 6,912,930 B2 | 7/2005 | Wang et al. | |
| 9,534,681 B2 | 1/2017 | Ishikawa | |
| 11,168,521 B2 * | 11/2021 | Shahipassand | E21B 4/006 |
| 2024/0209929 A1 * | 6/2024 | Chmielewski | F16H 49/001 |
| 2024/0209930 A1 * | 6/2024 | Chmielewski | B64C 13/34 |

FOREIGN PATENT DOCUMENTS

| | | | |
|---|---|---|---|
| CA | 3160866 A | | 2/2023 |
| CN | 113819213 A | * | 12/2021 |
| EP | 3312475 A2 | | 4/2018 |
| EP | 3792524 A1 | | 3/2021 |
| FR | 1326700 A | * | 5/1963 |

OTHER PUBLICATIONS

Extended European Search Report issued in European Application No. 24157280.9 dated Jun. 18, 2024.

* cited by examiner

*Primary Examiner* — Adam D Rogers
(74) *Attorney, Agent, or Firm* — CANTOR COLBURN LLP

(57) ABSTRACT

A harmonic drive, having a housing extending from first to second outer ends, the housing has radial outer and inner walls that extend axially between the first and second outer ends of the housing to define an annular channel having first and second ends that taper toward the first and second outer ends of the housing; a flex spline that extends axially between first and second ends and has a radial outer surface, and the first and second ends of the flex spline taper radially outwardly, the flex spline is located within the annular channel so that the first end of the flex spline is located within the first end of the annular channel and the second end of the flex spline is located within the second end of the annular channel; and first and second clamps that are clamped against the first and second ends of the annular channel.

16 Claims, 5 Drawing Sheets

HARMONIC DRIVE WITH FLEX SPLINE END CLAMPS

BACKGROUND

The application is directed to a harmonic drive and more specifically to a harmonic drive with flex spline end clamps.

Applications for a small diameter, high ratio gear can benefit from a harmonic drive. A flex spline shaft may have end sections formed as cup and hat shapes, that is, with a flange that is turned either inwardly or outwardly, to secure the flex spline within a drive housing. These configurations may reduce a usable volume within the drive. A flex spline shaft may instead have pancake style, e.g., flat, end sections. Such sections may have a reduced torque capacity and reduced efficiency compared with the turned end sections.

BRIEF SUMMARY

Disclosed is a harmonic drive, including a housing extending axially from a first outer end to a second outer end, wherein the housing has radial outer and inner walls that extend axially between the first and second outer ends of the housing to define an annular channel therebetween, the annular channel having a first end at the first outer end of the housing and a second end at the second outer end of housing, and the first and second ends of the annular channel taper toward the first and second outer ends of the housing; a flex spline that extends axially between first and second ends and has a radial outer surface, and the first and second ends of the flex spline taper radially outwardly, wherein the flex spline is located within the annular channel so that the first end of the flex spline is located within the first end of the annular channel and the second end of the flex spline is located within the second end of the annular channel; a first clamp that is clamped against the first end of the annular channel; and a second clamp that is clamped against the second end of the annular channel.

In addition to one or more aspects of the drive, or as an alternate the flex spline ends and channel define facing surfaces with cooperating ribs and slots that interact with each other to prevent rotation of the flex spline relative to the channel during operation of the drive.

In addition to one or more aspects of the drive, or as an alternate the first and second clamps are annular rings having a C-shaped cross section that, respectively open towards the first and second outer ends of the housing; and the first and second clamps define an outer profile that tapers to match the taper of the first and second ends of the annular channel.

In addition to one or more aspects of the drive, or as an alternate, the drive further includes first fasteners that engage the first clamp and urge the first clamp toward the first outer end of the housing to clamp the first clamp at the first end of the annular channel; and second fasteners that engage the second clamp and urge the second clamp toward the second outer end of the housing to clamp the second clamp at the second end of the annular channel.

In addition to one or more aspects of the drive, or as an alternate the first and second clamps have an axial inner end that defines a radially extending wall with circumferentially distributed apertures through which the first and second fasteners extend.

In addition to one or more aspects of the drive, or as an alternate the first and second clamps have a threaded inner profile; and the first and second fasteners are screws.

In addition to one or more aspects of the drive, or as an alternate the radial inner wall defines: an axially extending center channel; and a radially extending center gap at an axial center of the housing that segments the radial inner wall into a first segment that extends from the first end of the housing to the center gap and a second segment that extends from the second end of the housing to the center gap.

In addition to one or more aspects of the drive, or as an alternate, the drive further includes an input shaft located within the center channel, having a first end that extends axially past the first outer end of the housing and a second end that extends axially past the second outer end of the housing.

In addition to one or more aspects of the drive, or as an alternate, the drive further includes a first input shaft bearing disposed within the center channel, between the input shaft and the first segment of the radial inner wall; and a second input shaft bearing disposed within the center channel, between the input shaft and the second segment of the radial inner wall.

In addition to one or more aspects of the drive, or as an alternate: the flex spline includes a center portion having an outer facing spline; the input shaft has a center portion that defines a wave generator profile and extends through the center gap; and a wave generator bearing set, having inner and outer races and roller bearings between the inner and outer races, wherein the inner race is disposed against the center portion of the input shaft and the outer race is disposed against the center portion of the flex spline.

In addition to one or more aspects of the drive, or as an alternate, the drive further includes first and second roller bearing retainer clips disposed at axial ends of the wave generator bearing set; first and second thrust bearings that are adjacent to the first and second retainer clips and are seated on the input shaft; and first and second thrust bearing retainer clips that are adjacent to the first and second thrust bearings and the first and second segments of the radial inner wall, and are seated on the input shaft.

In addition to one or more aspects of the drive, or as an alternate the drive further includes an output shaft surrounds the center portion of the flex spline and includes: an inner facing spline that engages the outer facing spline of the flex spline; and at least one output shaft bearing disposed between the output shaft and the radial outer wall.

In addition to one or more aspects of the drive, or as an alternate the housing is formed by: a first housing member that extends axially between the first outer end of the housing and a first inner end of the first housing member; and a second housing member that extends axially between the second outer end of the housing and a second inner end of the second housing member that faces the first inner end of the first housing member.

In addition to one or more aspects of the drive, or as an alternate: the first and second inner ends of the first and second housing members define a center aperture that extends through a portion of the radial outer wall; and the output shaft has an output flange that extends radially outwardly through the center aperture in the radial outer wall, wherein the center aperture extends around the drive to provide for a predetermined rotational range of the output flange during operation of the drive.

Further disclosed is an aircraft including: a control surface; a motor; and the drive coupled to the control surface, wherein the motor is coupled to the input shaft and the control surface is coupled to the output flange.

In addition to one or more aspects of the aircraft, or as an alternate, the control surface is a wing flap.

BRIEF DESCRIPTION OF THE DRAWINGS

The present disclosure is illustrated by way of example and not limited in the accompanying figures in which like reference numerals indicate similar elements.

DETAILED DESCRIPTION

Aspects of the disclosed embodiments will now be addressed with reference to the figures. Aspects in any one figure is equally applicable to any other figure unless otherwise indicated. Aspects illustrated in the figures are for purposes of supporting the disclosure and are not in any way intended on limiting the scope of the disclosed embodiments. Any sequence of numbering in the figures is for reference purposes only.

Figure 3:
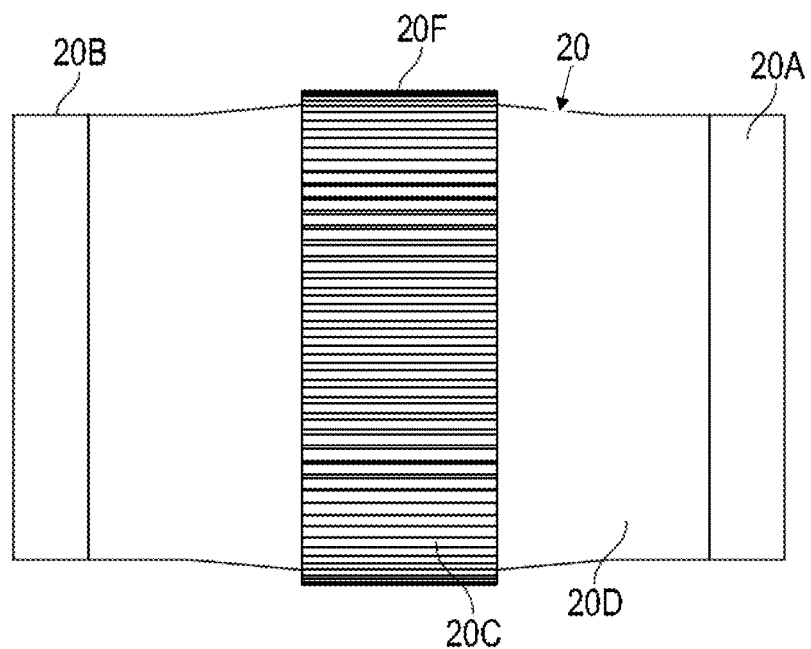
FIG. 3 shows a flex spline shaft that is utilized in the harmonic drive.
Figure 4:
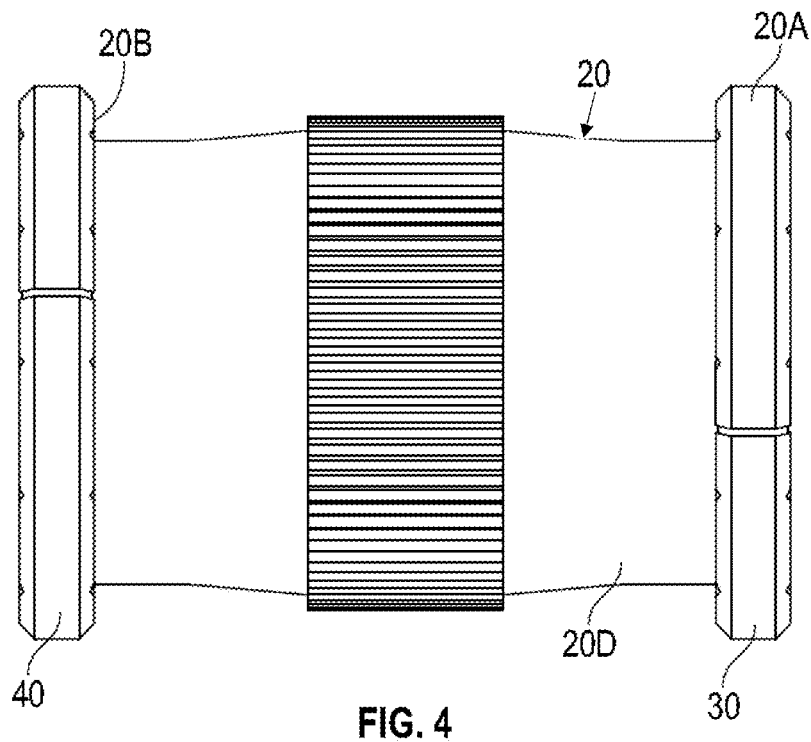
FIG. 4 shows the flex spline shaft with end clamps.
Figure 5:
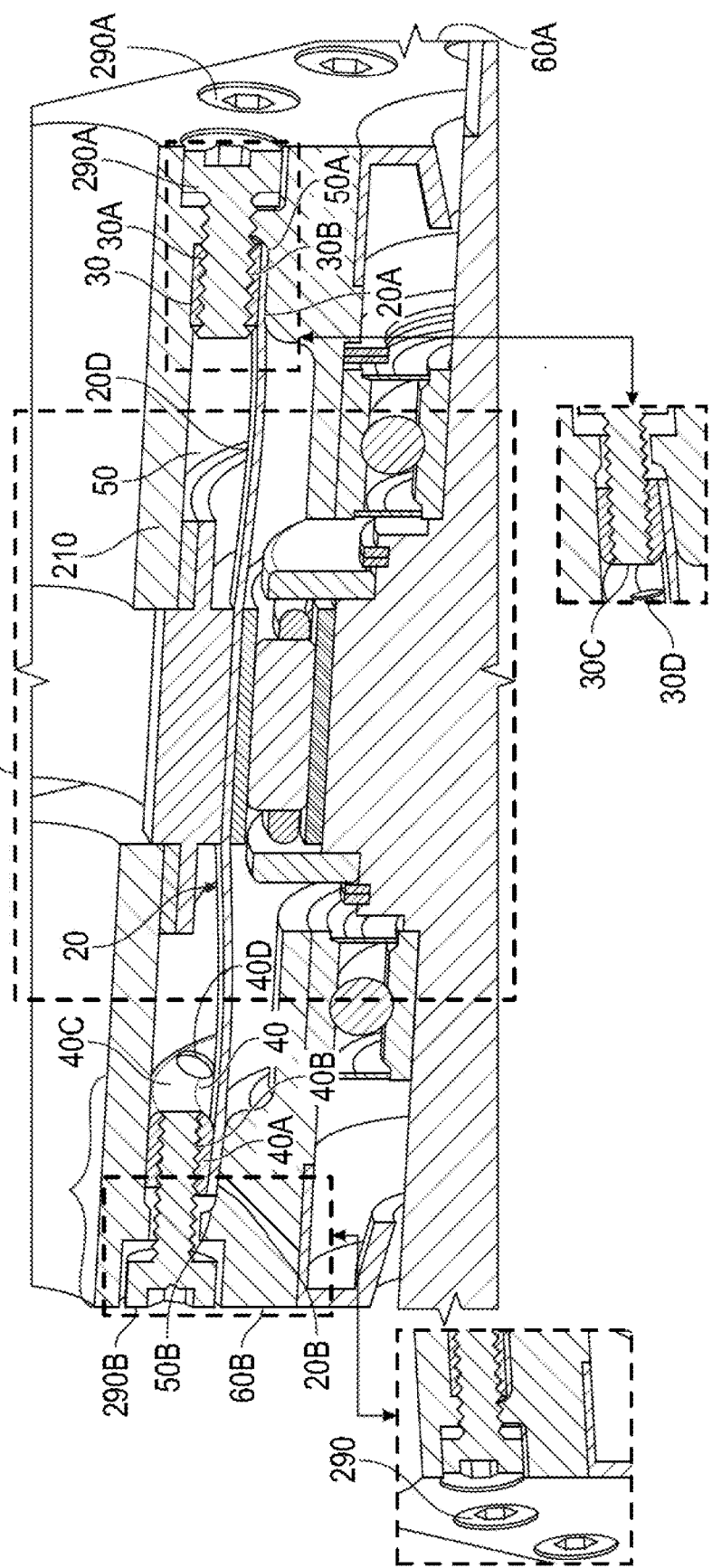
FIG. 5 shows a detail identified in FIG. 2 of a portion of the harmonic drive.

As disclosed in greater detail below, the embodiments disclosed herein provide a harmonic drive 10 with a flex spline 20 having tapered spline ends 20A, 20B that are flexible (FIG. 3). Tapered clamps 30, 40 are positioned against the tapered spline ends 20A, 20B (FIG. 4). The flex spline 20 is disposed in an annular channel 50 in a drive housing 60 (FIG. 5). The channel 50 has tapered channel ends 50A, 50B, which receive the tapered spline ends 20A, 20B and the tapered clamps 30, 40. The tapered clamps 30, 40 are configured to clamp the tapered spline ends 20A, 20B to the housing 60 by axially clamping (or urging) the ends of the flex spline 20 to the outer ends of the housing 60.

Figure 1:
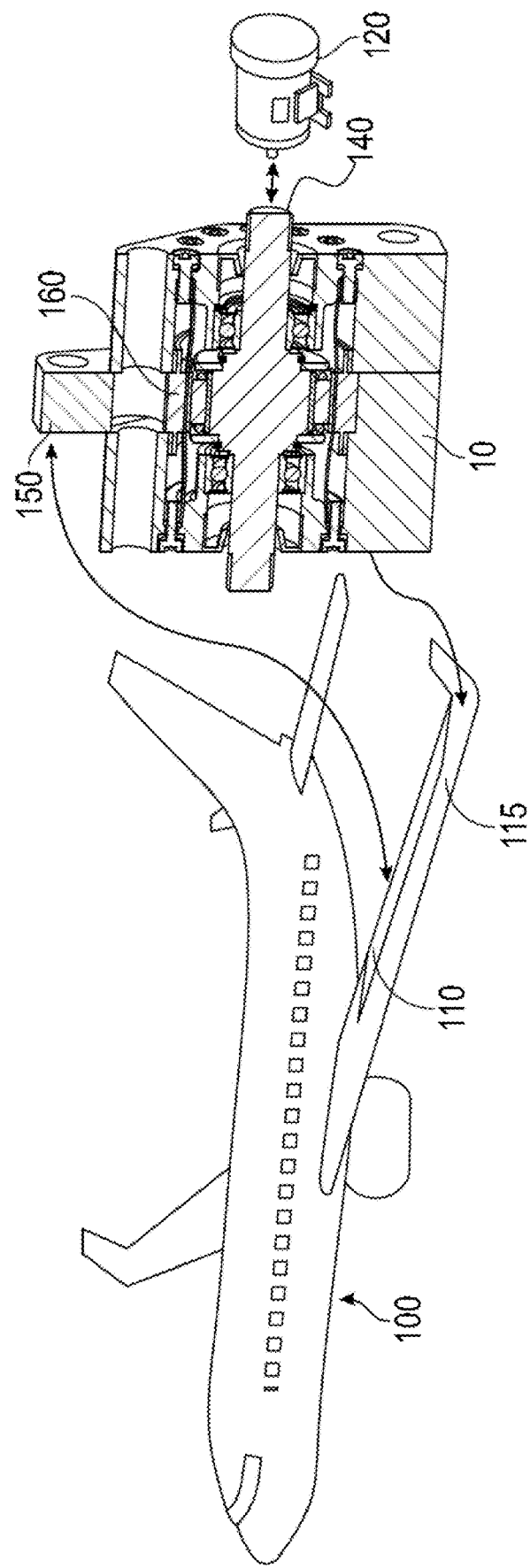
FIG. 1 shows a sectional view of a harmonic drive according to an embodiment operationally connected to an aircraft wing flap.

Turning to FIG. 1, an aircraft 100 includes a control surface 110, which may be a flap of a wing 115, a motor 120 and the drive 10 coupled to the control surface 110. The motor 120 is coupled to an input shaft 140 of the drive 10 and the control surface 110 is coupled to an output flange 150 of an output shaft 160 of the drive 10.

Figure 2:
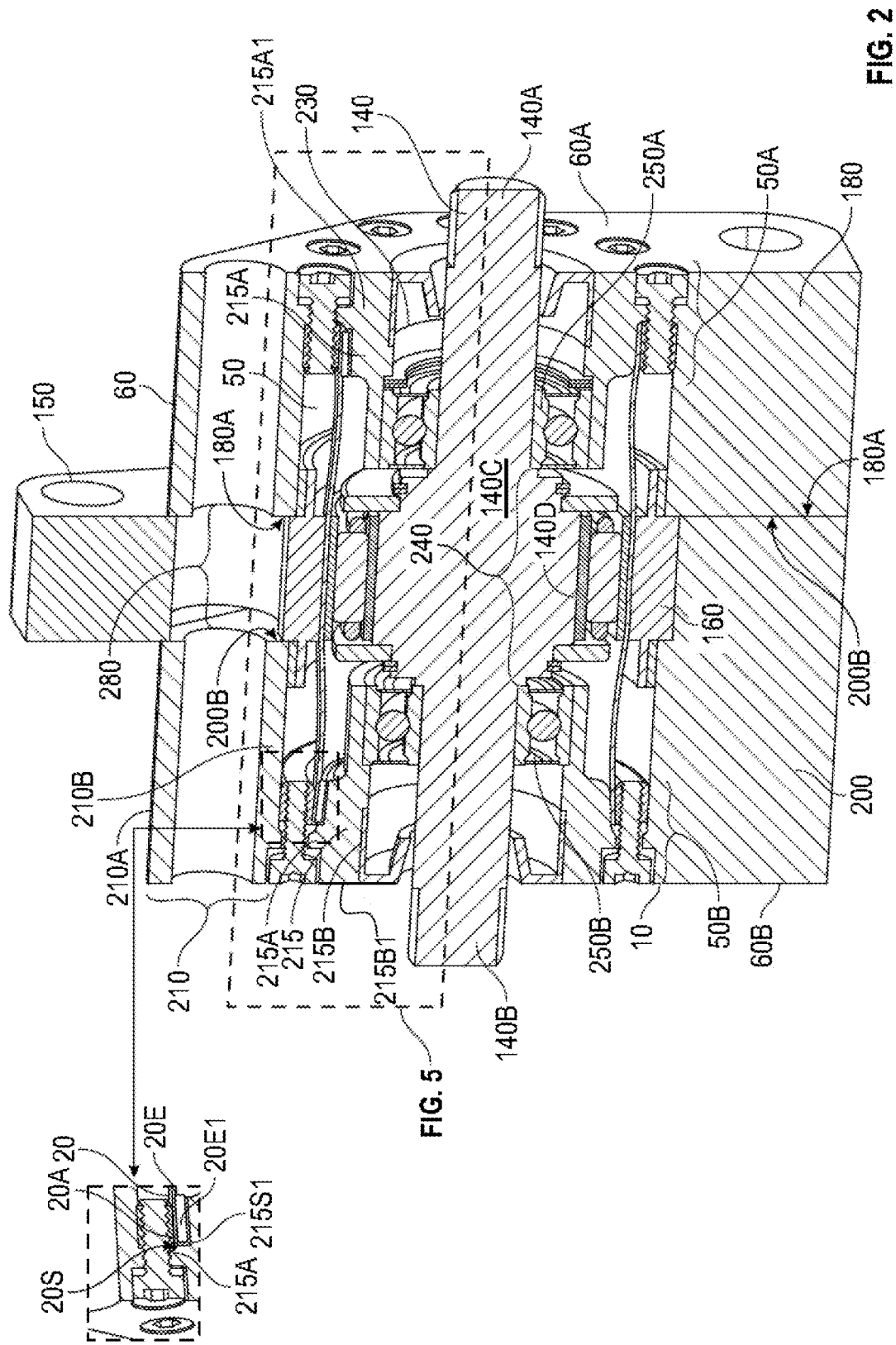
FIG. 2 shows the sectional view of the harmonic drive.

Turning to FIG. 2, additional details of the harmonic drive 10 are shown. The drive 10 has a housing 60 that extends from a first outer end 60A to a second outer end 60B. The housing 60 is formed by a first housing member 180 that extends axially between the first outer end 60A of the housing 60 and a first inner end 180A of the first housing member 180. A second housing member 200 of the housing 60 extends axially between the second outer end 60B of the housing 60 and a second inner end 200B of the second housing member 200 that faces the first inner end 180A of the first housing member 180.

The housing 60 has a radial outer wall 210 with outer and inner facing surfaces 210A, 210B, and a radial inner wall 215 with outer and inner facing surfaces 215A, 215B. The outer facing surface 210A of the outer wall 210 is the radial outer surface of the housing 60, e.g., between the opposing ends 60A, 60B. The radial outer and inner walls 210, 215 extend axially between the first and second outer ends 60A, 60B of the housing 60. The annular channel 50 is defined between the radial outer and inner walls 210, 215, e.g., between the inner surface 210B of the outer wall 210 and the outer surface 215A of the inner wall 210. The annular channel 50 has a first end 50A at the first outer end 60A of the housing 60 and a second end 50B at the second outer end 60B of the housing 60. As indicated, the first and second ends 50A, 50B of the annular channel 50 taper so that they are narrower, e.g., converge, toward the first and second outer ends 60A, 60B of the housing 60.

In the illustrated embodiment, the outer surfaces 20A, 20B of the flex spline ends is smooth as well as the outer surfaces 215A of the channel ends 50A, 50B. In one embodiment, the radial inner surface 20E of the spline 20, at axial outer surfaces 20A, 20B of flex spline ends, are formed with axially extending ribs 20E1 or tongues that interface with axially extending slots or grooves 215S1 formed along the outer surface 215A of the channel ends 50A, 50B, where the channel ends 50A, 50B form shoulders 20S to support the spline ends 20A, 20B. Thus, the flex spline ends and channel define facing surfaces, e.g., which face each other, with cooperating ribs and slots that interact with each other. This mating configuration prevents rotation of the flex spline relative to the housing 60 during operation.

The radial inner wall 215 defines an axially extending center channel 230, e.g., by its inner surface 215B. A radially extending center gap 240 at an axial center of the housing 60 segments the radial inner wall 215 into a first segment 215A1 that extends from the first end 60A of the housing 60 to the center gap 240 and a second segment 215B that extends from the second end 60B of the housing 60 to the center gap 240. The input shaft 140 is located within the center channel 230. The input shaft 140 has a first end 140A that extends axially past the first outer end 60A of the housing 60 and a second end 140B that extends axially past the second outer end 60B of the housing 60. The input shaft 140 has a center portion 140C with an outer surface 140D that defines a wave generator profile and extends through the center gap 240. That is, the surface 140D is smooth and shaped as an ellipse to provide harmonic motion as it rotates.

A first input shaft bearing 250A is disposed within the center channel 230. The first input shaft bearing 250A is located between the input shaft 140 and the first segment 215A1 of the radial inner wall 215A. A second input shaft bearing 250B is disposed within the center channel 230. The second input shaft bearing 250B is between the input shaft 140 and the second segment 215B of the radial inner wall 215. The input shaft bearings 250A, 250B are ball bearings.

The first and second inner ends 180A, 200B of the first and second housing members 180, 200 define a center aperture 280 that extends through a portion of the radial outer wall 210. The output flange 150 of the output shaft 160 extends radially outwardly through the center aperture 280 in the radial outer wall 210. The center aperture 280 extends around the drive 10 to provide for a predetermined rotational range of the output flange 150 during operation of the drive 10.

Figure 6:
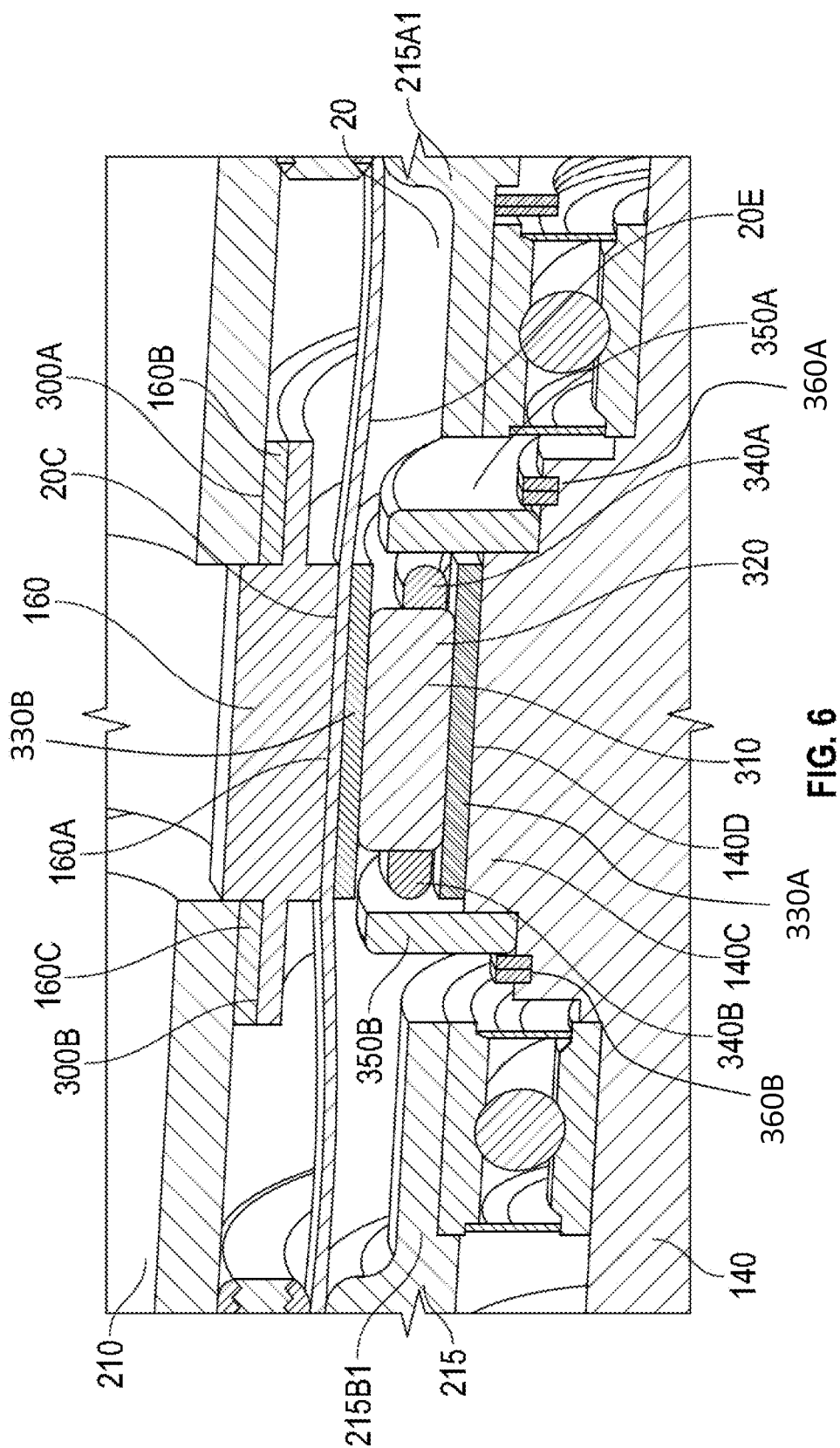
FIG. 6 shows a detail identified in FIG. 5 of a portion of the harmonic drive.

Turning to FIG. 3, the drive 10 includes the flex spline 20 (or flex spline shaft) that extends axially, includes first and second ends 20A, 20B, a center portion 20C, and has radial outer and inner surfaces 20D, 20E (FIG. 6). The first and second ends 20A, 20B of the flex spline 20 taper radially outwardly. The center portion 20C has an outer facing spline 20F. As shown in FIG. 4, the first clamp 30 is disposed against the radial outer surface 20D of the flex spline 20 at the first end 20A of the flex spline 20. The second clamp 40 is disposed against the radial outer surface 20D of the flex spline 20 at the second end 20B of the flex spline 20.

As shown in FIG. 5, the flex spline 20 and clamps 30, 40 are located within the annular channel 50. The first end 20A of the flex spline 20 and the first clamp 30 are located within the first end 50A of the annular channel 50 and the second end 20B of the flex spline 20 and the second clamp 40 are located within the second end 50B of the annular channel 50. The first clamp 30 is between the radial outer surface 20D of the flex spline 20 and the radial outer wall 210 the annular channel 50. The second clamp 40 is between the radial outer surface 20D of the flex spline 20 and the radial outer wall 210 of the annular channel 50. The clamps have an inner tapered surface that functions to clamp the tapered section of the flex spline toward the outwardly facing surface of the ground housings. The clamps are pulled axially by fasteners (discussed below), and the inner taper of the clamp functions to clamp the flex spline's tapered section to the outwardly facing inner surface of the ground housings. In the embodiments, the outer surface of the clamp has clearance to the housing.

The first and second clamps 30, 40 are annular rings having outer surfaces 30A, 40A that define a C-shaped cross section that opens toward the first and second outer ends 60A, 60B of the housing 60. The first and second clamps 30, 40 define an outer profile that tapers to match the taper of the first and second ends 50A, 50B of the annular channel 50. The first and second clamps 30, 40 have first and second inner surface 30B, 40B that are threaded. An axial inner end of the first and second clamps 30, 40 define radially extending walls 30C, 40C with circumferentially distributed apertures 30D, 40D.

The drive 10 includes first fasteners 290A that engage the first clamp 30 and urge the first clamp 30 toward the first outer end 60A of the housing 60 to clamp the first clamp 30 between the flex spline 20 and the radial outer wall 210 of the annular channel 50. Second fasteners 290B engage the second clamp 40 and urge the second clamp 40 toward the second outer end 60B of the housing 60 to clamp the second clamp 40 between the flex spline 20 and the radial outer wall 210 of the annular channel 50.

More specifically, the first and second fasteners 290A, 290B are threaded screws that engage the threaded profile of the first and second clamps 30, 40. The first and second fasteners 290A, 290B extend through the circumferentially distributed apertures 30D, 40D of the first and second clamps 30, 40 when urging the first and second clamps 30, 40 toward the first and second outer ends 60A, 60B of the housing 60.

The configuration of the taper of the first and second ends 20A, 20B of the flex spline 20, the first and second clamps 30, 40, and the first and second ends 50A, 50B of the annular channel 50, lock the flex spline 20 within the drive 10 during operation of the drive 10. This occurs without requiring the ends 20A, 20B of the spline 20 to be turned outwardly in a hat shape or inwardly in a cup shape, which otherwise reduces the usable volume within the drive 10. This also provide for better securing of the of the spline 20 within the drive 10 compared with a pancake-shaped spline ends.

Turning to FIG. 6, the output shaft 160 surrounds the center portion 20C of the flex spline 20. The output shaft 160 includes an inner facing spline 160A that engages the outer facing spline 20F (FIG. 3) of the flex spline 20. First and second output shaft bearings 300A, 300B is disposed between first and second axial outer portions 160B, 160C of the output shaft 160 and the radial outer wall 210.

A wave generator bearing set 310 is radially between the radial inner surface 20E of the flex spline 20 and the center portion 140C of the input shaft 140. The bearing set 310 has roller bearings 320 between outer and inner races 330A, 330B. The outer race 330A is disposed against the center portion 20C of the flex spline 20 and the inner race 330B is disposed against the center portion 140C of the input shaft 140, axially adjacent to the surface 140D formed with the wave generator profile. It is to be appreciated that the shaft, aside from the wave generator profile, as a circular cross section along its length, though the ends 140A, 140B may be keyed or geared to mate with the motor 120. The bearing set 310 extends axially between first and second roller bearing retainer clips 340A, 340B. First and second thrust bearings 350A, 350B are axially adjacent to the first and second retainer clips 340A, 340B and are seated on the input shaft 140. First and second thrust bearing retainer clips 360A, 360B are axially adjacent to the first and second thrust bearings 350A, 350B and the first and second segments 215A1, 215B1 of the radially inner wall 215 and are seated on the input shaft 140. The wave generator bearing set 310 harmonically engages the flex spline 20 with rotation of the input shaft 140 as a function of the wave generator profile of the outer surface 140D of the center portion 140C of the input shaft 140 to drive the output shaft 160.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A harmonic drive, comprising:
   a housing extending axially from a first outer end to a second outer end,
   wherein the housing has radial outer and inner walls that extend axially between the first and second outer ends of the housing to define an annular channel therebetween, the annular channel having a first end at the first outer end of the housing and a second end at the second outer end of housing, and at least one of the first and second ends of the annular channel tapers toward a respective one the first and second outer ends of the housing;
   a flex spline that extends axially between first and second ends and has a radial outer surface, and the first and second ends of the flex spline taper radially outwardly,
   wherein the flex spline is located within the annular channel so that the first end of the flex spline is located within the first end of the annular channel and the second end of the flex spline is located within the second end of the annular channel;

a first clamp that is clamped against the first end of the annular channel; and a second clamp that is clamped against the second end of the annular channel.

2. The drive of claim 1, wherein:

the flex spline ends and channel define facing surfaces with cooperating ribs and slots that interact with each other to prevent rotation of the flex spline relative to the channel during operation of the drive.

3. The drive of claim 1, wherein:

the first and second clamps are annular rings having a C-shaped cross section that, respectively open towards the first and second outer ends of the housing; and the first and second clamps define an outer profile that tapers to match the taper of the first and second ends of the annular channel.

4. The drive of claim 3, further comprising:

first fasteners that engage the first clamp and urge the first clamp toward the first outer end of the housing to clamp the first clamp at the first end of the annular channel; and second fasteners that engage the second clamp and urge the second clamp toward the second outer end of the housing to clamp the second clamp at the second end of the annular channel.

5. The drive of claim 4, wherein:

the first and second clamps have an axial inner end that defines a radially extending wall with circumferentially distributed apertures through which the first and second fasteners extend.

6. The drive of claim 5, wherein:

the first and second clamps have a threaded inner profile; and the first and second fasteners are screws.

7. The drive of claim 6, wherein:

the radial inner wall defines:

an axially extending center channel; and a radially extending center gap at an axial center of the housing that segments the radial inner wall into a first segment that extends from the first end of the housing to the center gap and a second segment that extends from the second end of the housing to the center gap.

8. The drive of claim 7, further comprising:

an input shaft located within the center channel, having a first end that extends axially past the first outer end of the housing and a second end that extends axially past the second outer end of the housing.

9. The drive of claim 8, further comprising:

a first input shaft bearing disposed within the center channel, between the input shaft and the first segment of the radial inner wall; and a second input shaft bearing disposed within the center channel, between the input shaft and the second segment of the radial inner wall.

10. The drive of claim 9, wherein:

the flex spline includes a center portion having an outer facing spline;

the input shaft has a center portion that defines a wave generator profile and extends through the center gap; and a wave generator bearing set, having inner and outer races and roller bearings between the inner and outer races, wherein the inner race is disposed against the center portion of the input shaft and the outer race is disposed against the center portion of the flex spline.

11. The drive of claim 10, further including:

first and second roller bearing retainer clips disposed at axial ends of the wave generator bearing set;

first and second thrust bearings that are adjacent to the first and second retainer clips and are seated on the input shaft; and first and second thrust bearing retainer clips that are adjacent to the first and second thrust bearings and the first and second segments of the radial inner wall, and are seated on the input shaft.

12. The drive of claim 10, further comprising:

an output shaft surrounds the center portion of the flex spline and includes:

an inner facing spline that engages the outer facing spline of the flex spline; and at least one output shaft bearing disposed between the output shaft and the radial outer wall.

13. The drive of claim 12, wherein the housing is formed by:

a first housing member that extends axially between the first outer end of the housing and a first inner end of the first housing member; and a second housing member that extends axially between the second outer end of the housing and a second inner end of the second housing member that faces the first inner end of the first housing member.

14. The drive of claim 13, wherein:

the first and second inner ends of the first and second housing members define a center aperture that extends through a portion of the radial outer wall; and the output shaft has an output flange that extends radially outwardly through the center aperture in the radial outer wall, wherein the center aperture extends around the drive to provide for a predetermined rotational range of the output flange during operation of the drive.

15. An aircraft including:

a control surface;

a motor; and the drive of claim 14 coupled to the control surface, wherein the motor is coupled to the input shaft and the control surface is coupled to the output flange.

16. The aircraft of claim 15, wherein:

the control surface is a wing flap.

* * * * *